United States Patent
Tao et al.

(10) Patent No.: US 10,212,556 B2
(45) Date of Patent: Feb. 19, 2019

(54) PROVIDING ROUTE INFORMATION TO DEVICES DURING A SHARED TRANSPORT SERVICE

(71) Applicant: Uber Technologies, Inc., San Francisco, CA (US)

(72) Inventors: Christine Tao, San Francisco, CA (US); Michael Jacobs, Oakland, CA (US)

(73) Assignee: Uber Technologies, Inc., San Francisco, CA (US)

( * ) Notice: Subject to any disclaimer, the term of this patent is extended or adjusted under 35 U.S.C. 154(b) by 68 days.

(21) Appl. No.: 15/612,737

(22) Filed: Jun. 2, 2017

(65) Prior Publication Data

US 2017/0272918 A1    Sep. 21, 2017

Related U.S. Application Data

(63) Continuation of application No. 14/846,132, filed on Sep. 4, 2015, now Pat. No. 9,706,367.
(Continued)

(51) Int. Cl.
| | |
|---|---|
| *H04W 4/02* | (2018.01) |
| *G01C 21/34* | (2006.01) |
| *H04W 4/04* | (2009.01) |

(52) U.S. Cl.
CPC .......... *H04W 4/046* (2013.01); *G01C 21/343* (2013.01); *G01C 21/3423* (2013.01); *G01C 21/3438* (2013.01); *H04W 4/02* (2013.01)

(58) Field of Classification Search
CPC ... H04W 4/02; G01C 21/343; G01C 21/3423; G01C 21/3438
(Continued)

(56) References Cited

U.S. PATENT DOCUMENTS

| | | |
|---|---|---|
| 6,341,255 B1 | 1/2002 | Lapidot |
| 6,356,838 B1 | 3/2002 | Paul |

(Continued)

FOREIGN PATENT DOCUMENTS

| | | |
|---|---|---|
| JP | 4148002 | 9/2008 |
| KR | 10-2013-0082834 | 7/2013 |

(Continued)

OTHER PUBLICATIONS

ISR and Written Opinion dated Aug. 31, 2016 in PCT/US2016/037454 International Search Report and Written Opinion issued in PCT/US2015/048604, dated Nov. 30, 2015.
(Continued)

*Primary Examiner* — Brian P Sweeney
(74) *Attorney, Agent, or Firm* — Mahamedi IP Law LLP

(57) ABSTRACT

A system and method of providing information about a transport service to user devices are described. The system arranges a transport service for a first user and a second user. The system determines first data corresponding to a first route from a location of a driver device of the driver to a first pickup location of the first user and second data corresponding to a second route from the first pickup location to a second pickup location of the second user. A combined route is determined based on the first data and the second data. The system transmits data associated with the first data without transmitting the data corresponding to the combined route to a first user device of the first user, and transmits data corresponding to the combined route to a second user device of the second user.

20 Claims, 10 Drawing Sheets

Related U.S. Application Data

(60) Provisional application No. 62/046,848, filed on Sep. 5, 2014.

(58) Field of Classification Search
USPC .......................................................... 701/410
See application file for complete search history.

(56) References Cited

U.S. PATENT DOCUMENTS

| | | |
|---|---|---|
| 6,378,072 B1 | 4/2002 | Collins |
| 6,646,604 B2 | 11/2003 | Anderson |
| 7,113,864 B2 | 9/2006 | Smith et al. |
| 7,133,770 B2 | 11/2006 | Zhao |
| 7,321,823 B2 | 1/2008 | Brülle-Drews |
| 7,463,975 B2 | 12/2008 | Bruelle-Drews |
| 8,086,400 B2 | 12/2011 | Huang |
| 8,224,571 B2 | 7/2012 | Huang |
| 8,417,448 B1 | 4/2013 | Denise |
| 8,417,449 B1 | 4/2013 | Denise |
| 8,509,987 B2 | 8/2013 | Resner |
| 8,670,930 B1 | 3/2014 | Denise |
| 8,718,926 B1 | 5/2014 | Denise |
| 8,762,048 B2 | 6/2014 | Kosseifi |
| 8,779,941 B2 | 7/2014 | Amir |
| 9,097,545 B1 | 8/2015 | Denise |
| 9,261,376 B2 | 2/2016 | Zheng |
| 2004/0093280 A1 | 5/2004 | Yamaguchi |
| 2004/0146047 A1 | 7/2004 | Turcan |
| 2005/0258234 A1 | 11/2005 | Silverbrook |
| 2006/0259837 A1 | 11/2006 | Teranishi |
| 2007/0236366 A1 | 10/2007 | Gur |
| 2008/0186210 A1 | 8/2008 | Tseng |
| 2011/0153629 A1 | 6/2011 | Lehmann |
| 2012/0197416 A1 | 8/2012 | Taira |
| 2012/0203428 A1 | 8/2012 | Choi |
| 2012/0226391 A1 | 9/2012 | Fryer |
| 2013/0024060 A1 | 1/2013 | Sukkarie |
| 2013/0063607 A1 | 3/2013 | Shimotono |
| 2013/0073327 A1 | 3/2013 | Edelberg |
| 2013/0147620 A1 | 6/2013 | Becker |
| 2013/0204526 A1 | 8/2013 | Boschker |
| 2013/0234724 A1 | 9/2013 | Kabasawa |
| 2013/0246301 A1 | 9/2013 | Radhakrishnan |
| 2014/0082069 A1 | 3/2014 | Varoglu et al. |
| 2014/0089202 A1 | 3/2014 | Bond |
| 2014/0189888 A1 | 7/2014 | Madhok |
| 2014/0322676 A1 | 10/2014 | Raman |
| 2014/0358745 A1 | 12/2014 | Lunan |
| 2014/0380264 A1 | 12/2014 | Misra |
| 2015/0033305 A1 | 1/2015 | Shear |
| 2015/0081362 A1 | 3/2015 | Chadwick et al. |
| 2015/0091713 A1 | 4/2015 | Kohlenberg |
| 2015/0206267 A1 | 7/2015 | Khanna |
| 2015/0293234 A1 | 10/2015 | Snyder |
| 2016/0016473 A1 | 1/2016 | Van Wiemeersch |

FOREIGN PATENT DOCUMENTS

| | | |
|---|---|---|
| KR | 10-2014-1452478 | 10/2014 |
| KR | 10-2015-0057165 | 5/2015 |

OTHER PUBLICATIONS

ISR and Written Opinion issued in PCT/US2015/048604, dated Nov. 30, 2015.
IPRP issued in PCT/US2015/048604 dated Mar. 16, 2017.

PROVIDING ROUTE INFORMATION TO DEVICES DURING A SHARED TRANSPORT SERVICE

RELATED APPLICATIONS

This application is a continuation of U.S. patent application Ser. No. 14/846,132, filed Sep. 4, 2015, which claims the benefit of U.S. Provisional Patent Application No. 62/046,848, filed Sep. 5, 2014; the aforementioned applications being hereby incorporated by reference in their entirety.

BACKGROUND

A transport service arrangement system can provide a platform to enable users to request transport services through use of computing devices. Drivers can also use the platform from their respective computing devices to receive invitations from the transport service arrangement system to perform the requested transport services.

DETAILED DESCRIPTION

Figure 1:
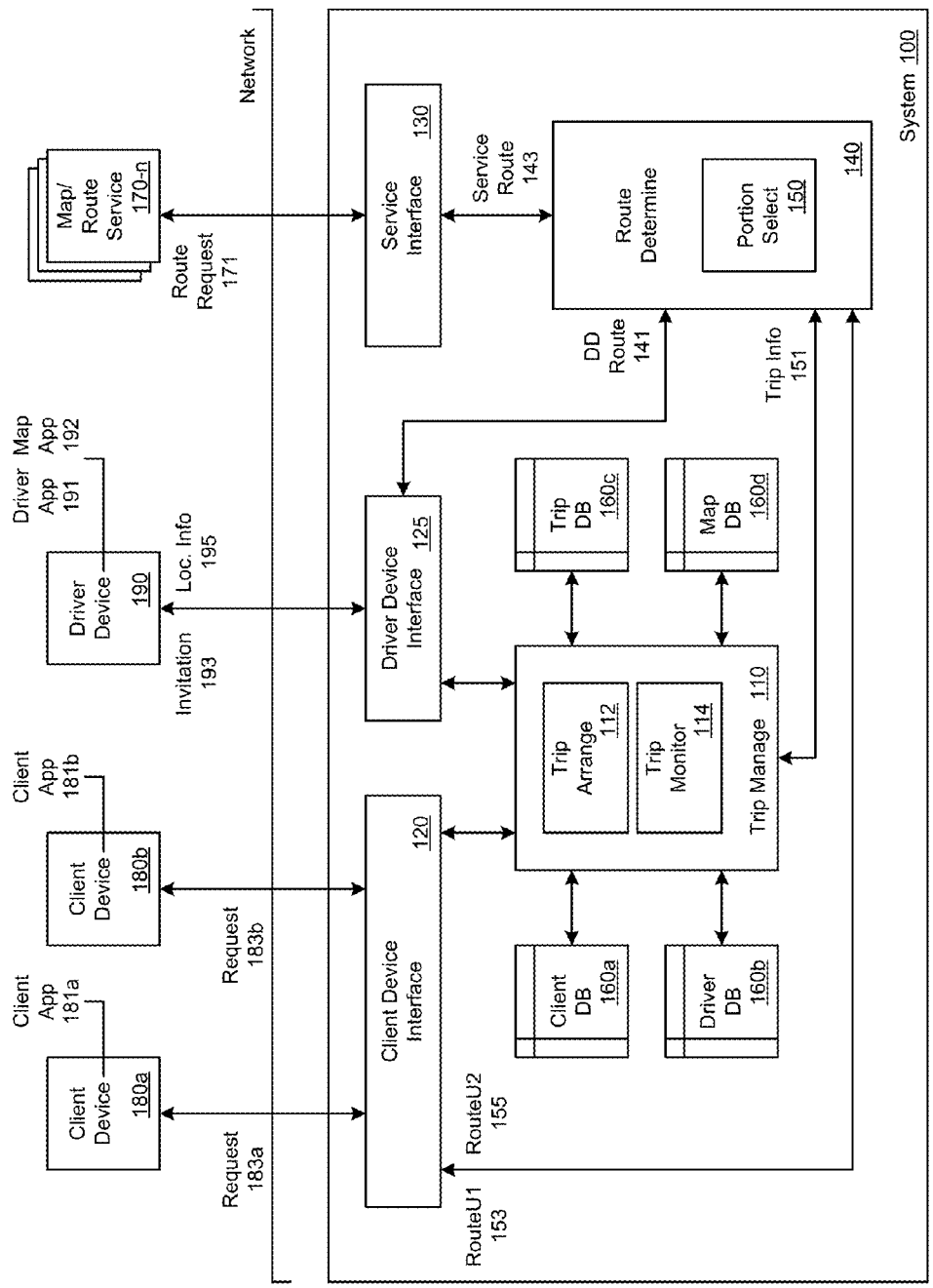
FIG. 1 illustrates an example system to provide route information to user devices during a shared transport service.

Examples described herein provide for a transport service arrangement system that determines and provides route information pertaining to a shared transport service to user devices of those users participating in the shared transport service. Because users of a shared transport service can have different pickup locations and/or destination locations, the system can provide route information that is tailored for individual users of the shared transport service. In this manner, at different times during the performance of the shared transport service, each user of the shared transport service can operate his or her respective device to see relevant route information that is specific to that user.

According to some examples, the system can arrange a shared transport service to be provided by a single driver for multiple users. As described herein, a shared transport service refers to a transport service (or trip) in which the driver concurrently provides transport for two or more users for at least a portion of the transport service. In one example, the system can determine a proposed route for a shared transport service for a first user and a second user from the driver's location to the last destination location of the shared transport service (referred to as a "total route"). The total route can be based on the order or manner in which the driver is to travel to the first and second users' pickup and destination locations. Based on the state of the shared transport service (and/or the driver's location), the system can determine what portion of the total route to provide to the first user device for presentation and what portion of the total route to provide to the second user device for presentation. The system can transmit data corresponding to the respective route portions to the respective devices. Such respective portions of the total route can correspond to relevant routes that are specific to the first and second users.

In another example, after arranging a shared transport service for a first user and a second user, the system can determine the state of the shared transport service, and based on the state, can determine relevant routes for the transport service for each of the first and the second users. As described herein, a relevant route for a user at one instance in time refers to a route from the driver's location to that user's pickup location or destination location (depending on the state of the shared transport service). In such an example, the system does not have to determine a total route, but can dynamically determine relevant routes based on the state of the shared transport service. The system can transmit data corresponding to the respective relevant routes to the respective first and second user devices.

Depending on implementation, the system can determine the total route and the portions of the total route periodically, or determine the relevant routes for the shared transport service periodically. By periodically determining the total route or relevant routes, the system can provide the latest or most up-to-date route information to the individual user devices. For example, the system can periodically (i) determine the total route for the shared transport service, (ii) determine route portions for the first and second users, and (iii) transmit data corresponding to the route portions to the respective first and second user devices, until the shared transport service is completed. The system can determine that the shared transport service is completed when there is only one user left that is being provided transport (e.g., because the transport service is no longer shared) or when the shared transport service is entirely completed by the driver (e.g., all users have been dropped off).

In one use case example, the system can determine first data corresponding to a first route from the driver's location (the location of the driver device) to a first pickup location of a first user, and can determine second data corresponding to a second route from the first pickup location to a second pickup location of the second user. The system can also determine a combined route corresponding to the first route and the second route based on the first data and the second data. In such an example, the system may have determined that the driver is to first pick up the first user and then pick up the second user, and that the driver is currently traveling to the first pickup location. The system can transmit the first data (or data associated with the first route, such as data that is in a different format than the first data but corresponds to the first route) to the first user device without transmitting the data corresponding to the combined route. The system can also transmit the data corresponding to the combined route to the second user device.

The first user device can use the first data to display the first route from the driver's location to the first pickup location. For example, the first user device can present the first route on a map user interface, such as using a set of lines that overlay the map user interface. Accordingly, the route from the first pickup location to the second pickup location would not be displayed to the first user at this time. On the other hand, the second user device can use the data corresponding to the combined route to display the route from the driver's location to the second pickup location. While a portion of the combined route corresponds to the first route, no indications or graphics of the first pickup location is shown with the combined route. In this manner, only the routes that are relevant to the individual users, from the viewpoint of the individual users, is provided to those users' devices.

Still further, depending on implementation, the system can determine routes from using or communicating with various sources. For example, the driver device can include a designated service application that communicates with the system. The designated service application can determine a first route from the driver's location to the first pickup location of the first user by communicating with a map application on the driver device and/or by communicating with a map or routing service. In one example, the map application can use the current location of the driver device and the first pickup location as input, communicate with a map or routing service associated with the map application, and receive information corresponding to the first route from the map or routing service. The designated service application can interface with the map application to receive the information corresponding to the first route, and provide, as first data, information corresponding to the first route to the system. In other examples, the system can determine the first route and/or the second route by communicating with one or more map or routing services using the driver's location and the location information of the shared transport service (e.g., the first pickup location, the second pickup location, the first destination location, the second destination location).

Among other benefits and technical effect, some examples described herein provide a mechanism to programmatically and selectively determine different route for different users of a specified group. This is in contrast to conventional approaches, in which, for example, a single route is determined and displayed for a single user or driver that is traveling from a start location to a destination location. As compared to such a conventional approach, the system, as described herein, can personalize information about a shared trip for multiple users by providing routes that are respectively tailored to the individual users. In this manner, in one example, based on the state data of the shared trip, each user would only be provided with a route that is pertinent to that user despite sharing the trip with another user. In addition, by providing different routes to individual users and by not specifically indicating the pickup locations or destination locations on the route of the other users of the shared trip, the system can preserve the users' privacy.

Examples as described enable route selection and determination to be performed to accommodate rider pooling, in a manner that balances the objectives of each party (driver, riders) without an ability of one party to manipulate the route selection for their own needs. Moreover, examples as described utilize secure and private communication channels to determine current and future locations of the participants. This information is not securely and reliably obtainable through manual processes, but requires computer-implemented continual communication (e.g., polling) and analysis with geo-aware mobile computing devices of known participants and potential participants. Through such communications, the data can be trusted as not being skewed for rider or driver through manual intervention. Additionally, computer-implemented processes can better determine the realm (e.g., number of potential riders for a route) or possibilities, through real-time determination and aggregation of information from multiple participants. Moreover, the information can be objectively used for riders and drivers alike through a remote service that makes decisions based on objective criteria (e.g., optimization). The information can be securely obtained to advance route planning technology, enabling functionality such as dynamic route selection and planning in context of events which can occur during rider pooling.

As used herein, a user device, a client device, a driver device, a computing device, and/or a mobile device refer to devices corresponding to desktop computers, cellular devices or smartphones, personal digital assistants (PDAs), laptop computers, tablet devices, etc., that can provide network connectivity and processing resources for communicating with the system over one or more networks. Client devices and driver devices can each operate a designated service application (e.g., a client application and a driver application, respectively) that is configured to communicate with the transport service arrangement system. A driver device can also correspond to a computing device that is installed in or incorporated with a vehicle, such as part of the vehicle's on-board computing system.

Still further, examples described herein relate to a variety of on-demand services, such as a transport service, a food truck service, a delivery service, an entertainment service, etc. to be arranged between users and service providers. In other examples, the system can be implemented by any entity that provides goods or services for purchase through the use of computing devices and network(s).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to provide route information to user devices during a shared transport service. In the example of FIG. 1, a transport service arrangement system 100 includes a trip manage 110, a client device interface 120, a driver device interface 125, a service interface 130, a route determine 140, and a plurality of databases, such as a client database 160a, a driver database 160b, a trip database 160c, and a map database 160d. A plurality of client devices, including at least a first client device 180a and a second client device 180b, and a plurality of driver devices (e.g., service provider devices), including the driver device 190, can communicate with the system 100 over one or more networks using, for example, respective designated service applications that are configured to communicate with the system 100. The components of the system 100 can combine to arrange a shared transport service for multiple users and to determine individual route information for the users. Logic can be implemented with various applications (e.g., software) and/or with hardware of a computer system that implements the system 100.

Depending on implementation, one or more components of the system 100 can be implemented on network side resources, such as on one or more servers. The system 100 can also be implemented through other computer systems in alternative architectures (e.g., peer-to-peer networks, etc.). As an addition or an alternative, some or all of the components of the system 100 can be implemented on client devices, such as through applications that operate on the client devices and/or the driver devices. For example, a client service application 181a or 181b that runs on the respective client device 180a or 180b and/or a driver service application 191 can execute to perform one or more of the processes described by the various components of the system 100. The system 100 can communicate over a network, via a network interface (e.g., wirelessly or using a wireline), to communicate with the one or more client devices and the one or more driver devices.

The system 100 can communicate, over one or more networks, with client devices and driver devices using a client device interface 120 and a device interface 125, respectively. The device interfaces 120, 125 can each manage communications between the system 100 and the respective computing devices. The client devices and the driver devices can individually operate client service applications and driver service applications, respectively, that can interface with the device interfaces 120, 125 to communicate with the system 100. According to some examples, these applications can include or use an application programming interface (API), such as an externally facing API, to communicate data with the device interfaces 120, 125. The externally facing API can provide access to the system 100 via secure access channels over the network through any number of methods, such as web-based forms, programmatic access via RESTful APIs, Simple Object Access Protocol (SOAP), remote procedure call (RPC), scripting access, etc.

In the example of FIG. 1, the system 100 can arrange a shared transport service to be provided for multiple users. While only two users are described as participating in the shared transport service for purpose of simplicity (e.g., a first user operating a first client device 180a and a second user operating a second client device 180b), in other examples, three or more users can participate in the shared transport service, with each user having a different pickup location and/or a destination location. Each of the first and second client devices 180a, 180b can run a client service application 181a, 181b, respectively, that each communicates with the system 100 for purpose of providing information about the transport service to the respective first and second users. A user can view the information on the client service applications 181a before making a request for a transport service. In one example, the users can specify a type of transport, such as a black sedan vehicle, a limousine, a sports utility vehicle (SUV) or a larger vehicle type that fits more than a standard vehicle size (e.g., more than four people), or a shared transport (e.g., a carpooling service type), using the service applications 181a, 181b. Still further, the service applications 181a, 181b can enable the users to select or input a respective pickup location and a respective destination location for a shared transport service and make a request for transport to be transmitted to the system 100 over one or more networks.

For example, the first user can make a request 183a for a transport service using the client application 181a, where the request 183a includes a pickup location for the first user ("first pickup location"), a destination location for the first user ("first destination location"), a vehicle type (which in this example is a shared transport type), and other information, such as the first user identifier (ID) and/or device ID. Similarly, the second user can make a request 183b for a transport service using the client application 181b, where the request 183b includes a pickup location for the second user ("second pickup location"), a destination location for the second user ("second destination location"), a vehicle type (which in this example again is a shared transport type), and other information, such as the second user ID and/or device ID. A user can specify that he or she is willing to share a transport service by selecting the shared transport type as the requested vehicle type. In addition, the users can specify pickup and destination locations by providing input (e.g., entering in an address or landmark, selecting a location frequently traveled, or moving a graphic indicator on a map, etc.) on the respective client applications 181a, 181b. Such pickup and destination locations can correspond to a latitude and longitude coordinate and/or an address or landmark. The system 100 can receive the requests 183a, 183b via the client device interface 120 and process the requests 183a, 183b to arrange the shared transport service for the first and second users.

According to examples, based on the parameters of a request for transport (e.g., when the request is made by a user and/or received by the system 100, the pickup and destination locations, the type of transport requested, etc.), the trip manage 110 can arrange a transport service for a user by selecting a driver to provide the transport service for the user. For example, based on the pickup locations and the destination locations, the trip manage 110 can determine that a single driver can pick up a first user and then pick up a second user, as the destination locations for the first and second users may be in a similar area of a city or geographic region, and thereby concurrently provide transport for the first and second user for at least a portion of the transport service. In the example of FIG. 1, for purpose of illustration, the trip manage 110 can determine that the parameters of the first and second users' requests 183a, 183b are such that a single driver can be selected to perform the shared transport service for the first and second user.

Depending on implementation, the trip manage 110 can select a driver after receiving one of the requests (and/or before receiving the second request), or can select a driver after receiving both the requests 183a, 183b. In either implementation, for purposes of FIG. 1, the trip arrange 112 can select a driver, such as the driver operating the driver device 190, to provide a shared transport service for the first user and the second user based on the requests 183a, 183b.

In one example, the trip arrange 112 can receive the request 183a and select a driver to provide the transport service for the first user. The trip manage 110 can access the client database 160a to verify or authorize the first user and/or can access the driver database 160b, which stores real-time or close to real-time location and status information of drivers, to determine which driver should be selected to provide the transport service for the first user. After selecting the driver, the trip manage 110 can transmit an invitation 193 to the driver device 190 of the selected driver via the driver device interface 125, and can also transmit location information 195 corresponding to the first pickup location of the first user identified from the request 183a. Depending on variations, the trip manage 110 can transmit the first destination location along with the first pickup location or can transmit the first destination location at a later time (e.g., after the invitation 193 is accepted). The driver application 191 can display a user interface corresponding to the invitation 193 and show information about the first pickup location. The driver can then operate the driver application 191 to provide an input to accept the invitation 193. In another example, the driver can automatically accept the invitation 193 by not rejecting the invitation 193 within a specific duration of time (e.g., ten seconds).

In addition, according to some examples, when the driver accepts the invitation 193, the driver application 191 can communicate with a map application 192 stored on the driver device 190 and/or communicate with a map or routing service 170 over one or more networks to determine the route from the driver's current location (e.g., the current location of the driver device 190) to the first pickup location (referred to herein as a "first route"). For example, the driver application 191 and/or the map application 192 can interface with a global positioning system (GPS) component of the driver device 190 to determine the driver's current location. The driver application 191 can provide information about the first pickup location to the map application 192, which can communicate the driver's current location and the first pickup location to the corresponding map or routing service 170. The map or routing service 170 can use the information to determine the proposed best or most efficient route (e.g., one with the shortest distance and/or shortest duration of time) for the driver.

Depending on examples, the map/routing service 170 can be a third-party service provided by an entity that is different than one that implements the system 100, can be an open-source routing service that provides a routing engine, or can be a routing engine that is implemented as part of the system 100. The driver application 191 can receive data corresponding to the first route from the map application 192 and/or the map or routing service 170, and display the first route as part of a map interface (e.g., as route lines that overlay a map, etc.) in order to provide the driver with the first route along with corresponding directions to the first pickup location, in some examples. In addition, because the driver's position may change as the driver travels to the first pickup location, the driver application 191 can periodically determine the data corresponding to the first route via the map application 192 and/or the map or routing service 170. The driver application 191 can then periodically update the first route on the map interface for the driver.

Still further, in some examples, the driver application 191 can also periodically provide the data corresponding to the first route or the current location of the driver to the system 100. For example, each time the driver application 191 determines the first route based on the driver's current location, the driver application 191 can transmit the data corresponding to the first route to the system 100. In one example, the driver application 191 can periodically transmit the driver's current location, the state of the transport service (or the driver's status, such as "on route"), and/or the data corresponding to the first route to the trip manage 110 (e.g., every four seconds). The trip monitor 114 can update an entry for the shared transport service (e.g., a "trip entry") in the trip database 160c with the information received from the driver application 191. The route determine 140 can periodically receive the data corresponding to the first route via the driver device interface 125 (referred to herein as driver device route or "DD route" 141). As an addition or an alternative, the route determine 140 can independently and periodically determine the DD route 141 based on the driver's current location and the first pickup location by communicating with a map/routing service 170 over one or more networks. The route determine 140 can then periodically provide the DD route 141 data to the driver application 191 for display.

Once the transport service is arranged for the first user, the trip monitor 114 can monitor the progress of the driver and/or the shared transport service as a whole. The trip monitor 114 can update the trip entry as the shared transport service progresses. The route determine 140 can receive the DD route 141 and provide route information relevant to the first user to the first user device 180a. At this time, based on the state of the driver or the trip (e.g., the driver is on route and has not yet picked up the first user), the relevant route information for the first user can be the first route. The route determine 140 can receive trip information 151 from the trip monitor 114 (or retrieve the trip information 151 from the trip entry in the trip database 1760c), including the trip ID for the first user's transport service, the first user's user ID, the driver's ID, the current state of the transport service, and/or the location of the driver device 190.

In this example, at this instance in time, no other second user has yet been assigned to share the transport service with the first user. The route determine 140 can determine, from the trip information 151, that the relevant route information to be provided to the first user corresponds to the first route, in order to show the first user where the driver is and the potential route of travel of the driver to pick up the first user. The route determine 140 can provide data corresponding to a route that is specifically relevant for the first user (e.g., as "RouteU1 153") to the first user device 180a. The client application 181a can use the RouteU1 153 to display the corresponding route along with a map user interface of the client application 181a (e.g., so that the route overlays the map). In this manner, the route determine 140 can periodically transmit the RouteU1 153 to the first user device 180a as the driver moves to the first pickup location.

When the second user makes the request 183b, the trip arrange 112 can receive the request 183b, and based on the first pickup location and first destination location of the first user and the second pickup location and the second destination location from the request 183b, the trip arrange 112 can determine that the driver is to provide the shared transport service for both the first and the second user. In this example, the second user has made the request 183b while the driver is still traveling to the first pickup location. The trip manage 110 can transmit a second invitation and location information corresponding to the second user to the driver device 190. Once the driver accepts the second invitation, the shared transport service can be arranged for the first and second users. In some examples, the driver can be automatically assigned to also provide transport for the second user.

In another example, the trip manage 110 can select a driver for the first user and the second user after receiving and processing both the requests 183a, 183b. The trip manage 110 can transmit an invitation 193 for both users to the driver device 190, and when the driver accepts the invitation 193, the driver application 191 can determine a route from the driver's location to one of the pickup locations (depending on the order of the shared transport service, discussed below). Regardless of whether the trip manage 110 selects the driver after receiving one of the requests (and before receiving the second request), or selects the driver after receiving both the requests 183a, 183b, once the shared transport service is arranged for the driver and the first and second users, the route determine 140 can periodically determine a total route for the shared transport service and/or determine relevant routes for the first and second users, and transmit corresponding route information to the first and second user devices 180a, 180b.

The individual relevant route information for users can be based on an order in which the shared transport service is to be performed by the driver. For a shared transport service, the trip arrange 112 can determine an order in which the shared transport service is to be provided for the first and second users (e.g., pick up the first user, then pick up the second user, then drop off the second user, then drop off the first user) based on the driver's current location, the first and second pickup locations, and the first and second destination locations. The trip arrange 112 can access the map database 160d which stores map data, for example, to determine the order of the shared transport service, so as to provide the driver with the most efficient way to provide the shared transport service (e.g., the shortest distance and/or the least amount of time the driver has to travel and/or spend to pick up and drop off both the first and second users). As an addition or an alternative, the trip arrange 112 can also communicate with a map/routing service 170 to determine the proposed route for determining the shortest distance and/or the last amount of time the driver has to travel to provide the shared transport service.

The trip manage 110 can provide information about the order of the shared transport service to the driver device 190 to instruct the driver on who to pick up first, who to pick up second, who to drop off first, etc. For example, the driver application 191 can use the information about the order to provide instructions, in sequence, based on the state of the shared transport service and/or the driver's location. In this manner, the driver application 191 can first display instructions informing the driver to pick up the first user at the first pickup location, and then when the driver picks up the first user, can display instructions informing the driver to pick up the second user at the second pickup location. Similarly, after the driver picks up the second user, the driver application 191 can display instructions informing the driver to drop off the first user or the second user based on the determined order. According to some examples, the trip manage 110 can instruct the driver to pick up the second user first, even though the driver was initially instructed to pick up the first user first based on the determined order.

Depending on implementation, the route determine 140 can periodically determine the state of the shared transport service (and/or the driver's location) and periodically determine route information to provide to the first user and to the second user. The system 100 can determine the state of the transport service and/or the driver location by receiving data from the driver device. The route determine 140 can receive the trip information 151 from the trip manage 110, or from accessing the trip database 160c. According to an example, the driver can provide input via the driver application 191 at different times to indicate different states of the transport service, such as when the trip has started for the first user (e.g., the first user has been picked up), when the trip has started for the second user, when the first user has been dropped off, etc. Based on the current state of the transport service and the order of the shared transport service, the route determine 140 can determine what route information is to be provided to which users.

Figure 2A:
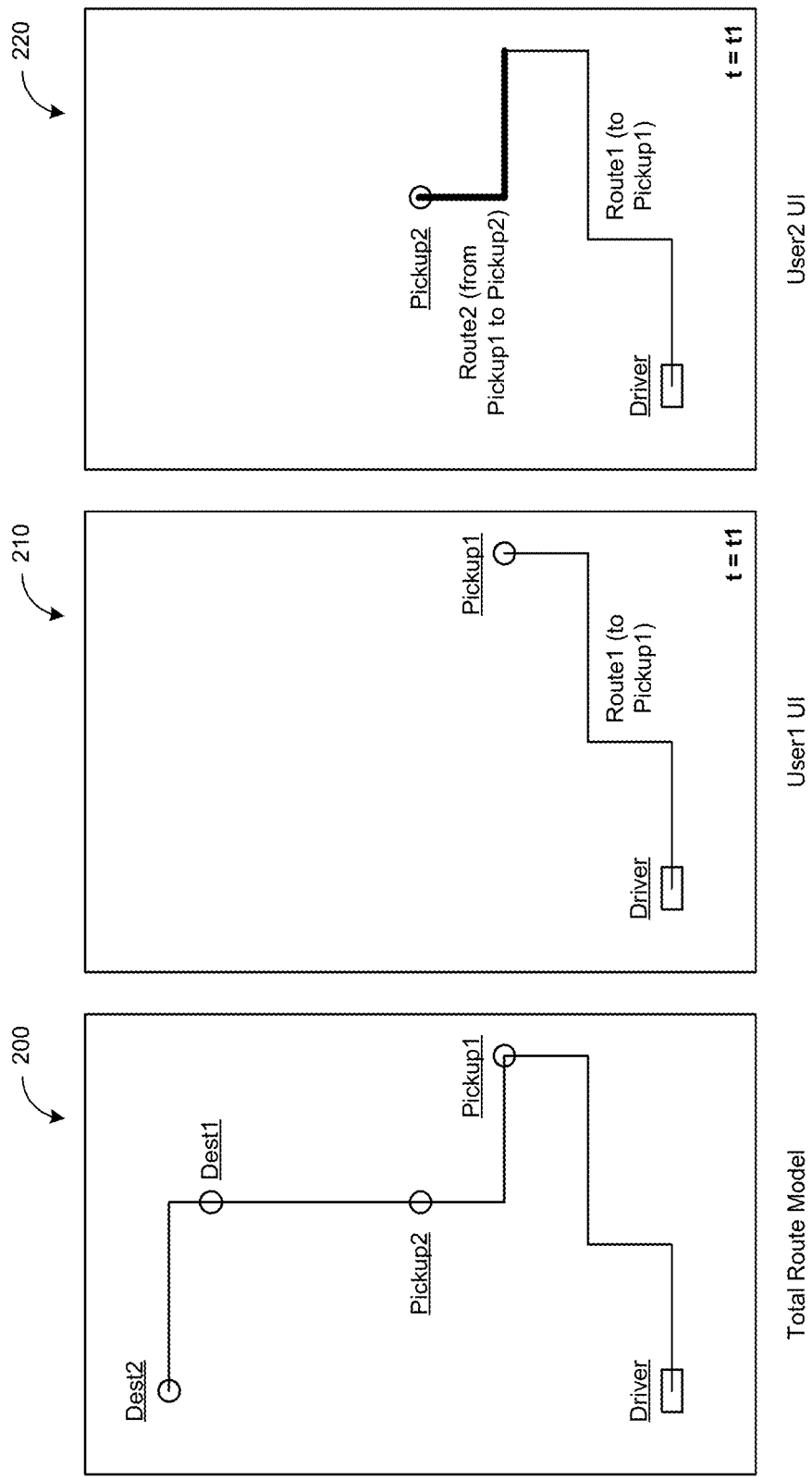
FIGS. 2A through 2C are diagrams illustrating a use case example of providing route information.
Figure 2B:
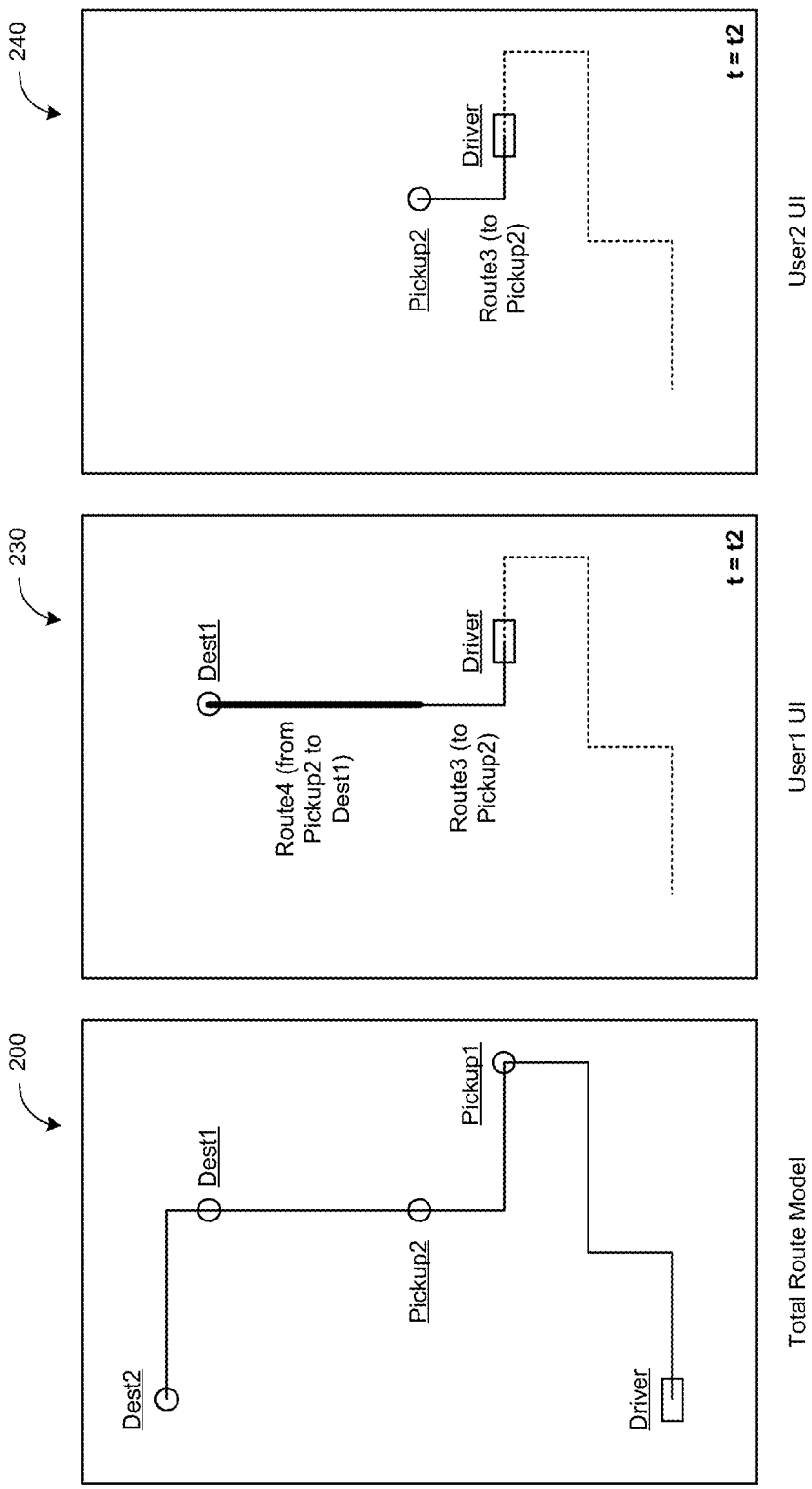
Figure 2C:
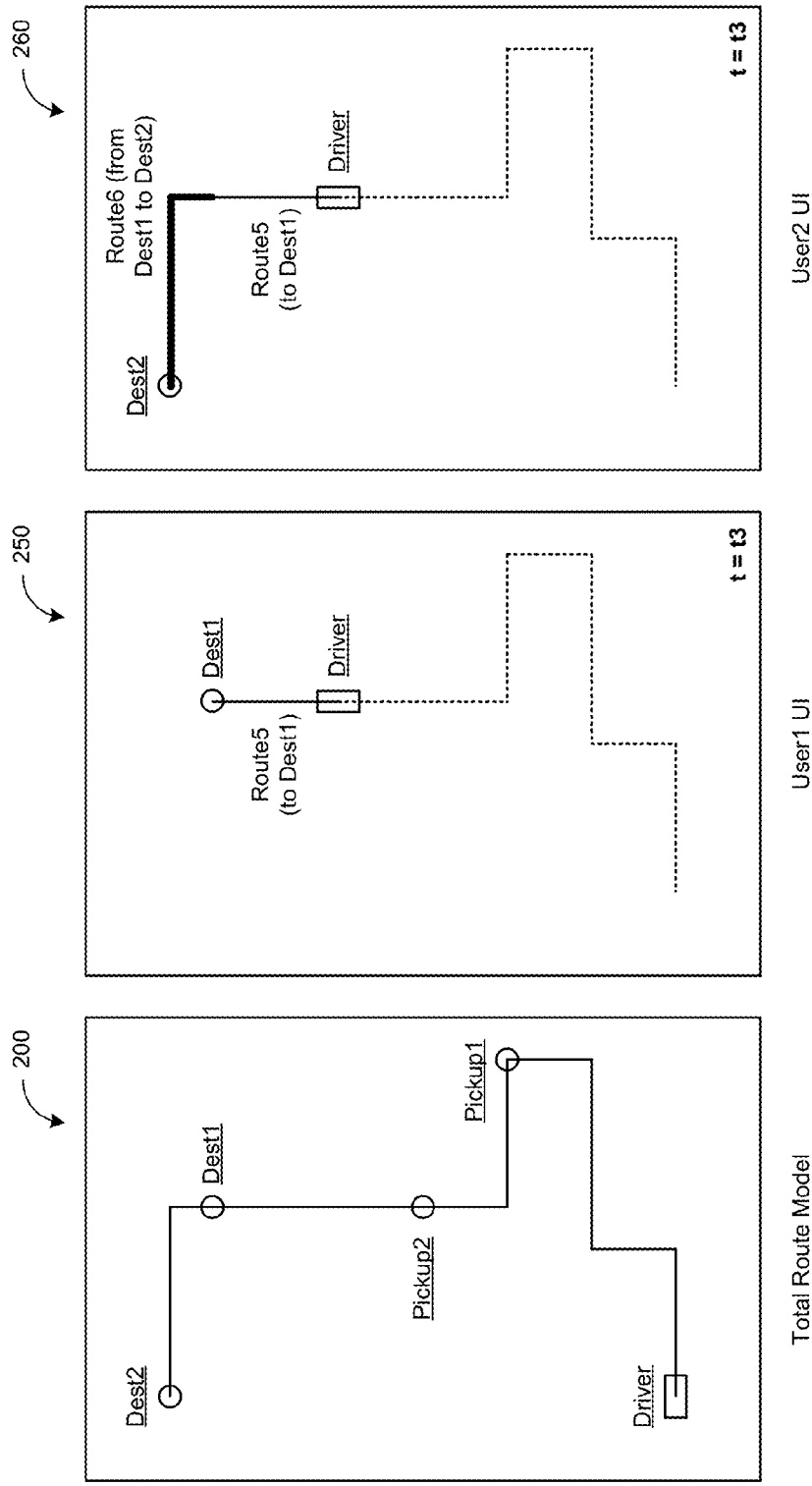

For example, referring to FIGS. 2A through 2C for illustrative purposes, the diagram 200 is a model of a potential total route of the shared transport service. The diagram 200 can be used as a reference in comparison with the other diagrams of FIGS. 2A through 2C. In the example of FIG. 2A, the system 100 has determined that the driver is to provide the shared transport service in the following manner: pick up the first user first at the first pickup location, then pick up the second user at the second pickup location, then drop off the first user at the first destination location, and then drop off the second user at the second destination location.

For example, at time t=t1, during a time when the driver is traveling to the first pickup location (e.g., the shared transport service is in a state in which no user has been picked up yet), the route determine 140 can determine first data corresponding to the first route from the driver's current location to the first pickup location and can determine second data corresponding to a second route from the first pickup location to the second pickup location. In this example, the driver has been assigned to provide shared transport for both the first user, User1, and the second user, User2. At this state of the shared transport service, the first route can be relevant to the first user so that the first user can see where the driver is and how the driver is potentially going to travel to the first user (shown in the diagram 210), while a combination of the first route and the second route (shown in the diagram 220) can be relevant to the second user (e.g., from the viewpoint of the second user, the combined route of the first and second route can indicate the potential path of travel of the driver to pick up the second user).

According to an example, the driver device 190 can periodically determine the first route by periodically receiving the DD route 141 from the driver device 190. The driver application 191 and/or the map application 192 operating on the driver device 190 can periodically determine the first route in order to provide route information to the driver, such as described above. The driver application 191 and/or the map application 192 can then transmit the DD route 141 corresponding to the first route to the route determine 140. In this manner, the route determine 140 can use the route data already computed by the driver application 191 and/or the map application 192. Alternatively, the route determine 140 can determine the DD route 141 based on the driver's current location and the first pickup location. The route determine 140 can determine the second route by communicating, over the service interface 130, with one or more map or routing services 170. The route determine 140 can provide a route query or a route request 171, which includes a start location and an end location for a route, to a map or routing service 170. In this example, the start location can correspond to the first pickup location and the end location can correspond to the second pickup location. The route determine 140 can receive data corresponding to the second route via the service interface 130 from the map or routing service 170 (referred to herein as "service route" 143).

The route determine 140 can determine a combined route corresponding to the first route and the second route using these determined DD route 141 and service route 143. In this example, based on the driver's state or state of the shared transport service (e.g., at time t=t1, the state of traveling to the first pickup location), the route determine 140 can determine that data corresponding to the first route is to be provided to the first user and that data corresponding to the combined route is to be provided to the second user (e.g., using the respective user's user IDs and/or device IDs from the trip information 151). The route information relevant to the first user ("RouteU1 153") can be transmitted, via the client device interface 120, to the first client device 180*a*, while the route information relevant to the second user ("RouteU2 155") can be transmitted, via the client device interface 120, to the second client device 180*b*. The client applications 181*a*, 181*b*, can use the RouteU1 153 and the RouteU2 155, respectively, to display the corresponding route on a map user interface of the client applications 181*a*, 181*b*, such as shown in the diagrams 210, 220 of FIG. 2A respectively. In this manner, because the route determine 140 periodically determines the first route, the second route, and the combined route, and periodically provides the relevant route information to the respective first and second user devices 180*a*, 180*b*, the first user and the second user can see the potential route that the driver travels to get to the respective users' pickup locations.

Still further, in some examples, as illustrated in the diagrams 210, 220, while a graphic indicator of the driver can be displayed on the map user interface, only a graphic indicator of a location that is specific to the individual users are displayed on the map user interface. For example, for the first user, a graphic indicator of the first pickup location may be displayed with the first route, but no graphic indicator of the second pickup location is provided on the map user interface, and vice versa for the second user. Because no specific location information, address, or graphic indicators of a user is displayed to another user, the system 100 can preserve the privacy of individual users despite the users sharing in the shared transport.

In another example, at time t=t2, such as shown in FIG. 2B, the driver has already reached the first pickup location, has picked up the first user for transport, and is traveling to pick up the second user (e.g., driver is in on route state for the second user). The driver can provide an input, via the driver application 191, to indicate that the transport service has started for the first user once the user has been picked up. When the shared transport service is in a state in which transport has started for the first user, but not the second user, the route determine 140 can periodically determine third data corresponding to a third route from the driver's current position to the second pickup location and can periodically determine fourth data corresponding to a fourth route from the second pickup location to the first destination location. At this state of the shared transport service, the third route can be relevant to the second user so that the second user can see the potential route the driver will travel to get to the second pickup location (as well as the driver's current location) (shown in the diagram 240). The combination of the third route and the fourth route can be the route that is relevant to the first user (shown in the diagram 230), who is already traveling in the vehicle (from the viewpoint of the first user, the potential route that the driver will take to get to the first destination location of the first user is the route that is pertinent to the first user).

According to some examples, when the driver provides an input on the driver application 191 indicating that the transport service has started for the first user, the driver application 191 can identify the next location that the driver has to travel to based on the order of the shared transport service, which in this example, is the second pickup location. In response to the user input, the driver application 191 and/or the map application 192 can periodically determine the third route from the driver's current position to the second pickup location by communicating with a map or routing service, as discussed above. Again, the driver application 191 and/or the map application 192 can then transmit the DD route 141 corresponding to the third route to the route determine 140. The route determine 140 can determine the fourth route by providing, over the service network 130, a route request 171 for the second pickup location to the first destination location to one or more map or routing services 170. The map or routing service 170 can process the route request 171 and return the data corresponding to the fourth route as the service route 143.

The route determine 140 can determine a combined route corresponding to the third route and the fourth route using these determined DD route 141 and service route 143. In this second example, because the state of the shared transport service is such that the first user is being provided transport but the second user has not yet been picked up, the route determine 140 can determine that data corresponding to the third route is to be provided to the second user and that data corresponding to the combined route of the third and fourth routes should is to be provided to the first user. Similarly, as discussed above, the client applications 181*a*, 181*b*, can receive the respective data of relevant routes for the respective users (RouteU1 153, RouteU2 155) and display the corresponding routes on a map user interface of the client applications 181*a*, 181*b*, such as shown in the diagrams 230, 240 of FIG. 2B respectively.

FIG. 2C illustrates diagrams at a subsequent time, t=t3, where the driver has picked up both the first and second users and is transporting both users. In the example of FIG. 2C, the diagram 250 illustrates the route information that is displayed to the first user. The fifth route from the driver's location to the first destination location. According to some examples, the fifth route is determined by the driver device 190 (through use of the driver application and/or the map application 192) and transmitted to the route determine 140. The route determine 140 can also determine the sixth route from the first destination location to the second destination location, and can determine the combined route corresponding to the fifth and sixth route. The diagram 260 illustrates the route information displayed to the second user. In this example, the first user would only see the route information pertaining to the first user, while the second user would see the entire route from the driver's current location to the second destination location.

Because the system 100 periodically determines various routes based on the state of the shared transport service and periodically provides relevant routes to the client devices 180*a*, 180*b* as the driver travels to fulfill the shared transport service, the client applications 181*a*, 181*b* can periodically update the position of the driver and the route information. In this manner, the client applications 181*a*, 181*b* can dynamically display the route lines along with the driver icon so that the route line(s) dynamically change (e.g., shorten as the vehicle moves) and so that the position of the driver graphic dynamically changes.

In addition, the diagrams of FIGS. 2A through 2C illustrate dotted lines showing previous portions of routes or showing where the driver may have traveled. These dotted lines may or may not be displayed to on the map interface, depending on variations. Similarly, the route lines are shown in different thicknesses in the diagrams of FIGS. 2A through 2C for illustrative purposes. To a user that views a combined route information on the client application, the route lines can be uniformly displayed (e.g., without varying thicknesses) so that one user may not view or keep a record of the pickup or destination locations of the other user. Still further, in some implementations, icons or markers corresponding to the pickup locations and/or destination locations are selectively displayed to individual client devices so that only those locations specified by a user can be seen by that user on the client application (as shown in the diagrams 250 and 260 of FIG. 2C).

Referring back to FIG. 1, in the example described, the route determine 140 can determine relevant routes for the first and second users based on the state of the shared transport service. As an addition or an alternative, in another example, after the shared transport service is arranged for the first and second users, the route determine 140 can periodically determine the total route of the shared transport service, from the driver's current location to the last destination location of the shared trip (e.g., the first destination location or the second destination location) based on the specified order of the shared transport service. An example of the total route can be illustrated by the model in diagram 200 of FIG. 2C.

Depending on implementation, the route determine 140 can receive data corresponding to the total route from the driver device 190, can receive data corresponding to the total route from a map or routing service 170, or can receive data corresponding to the total route as portions from the driver device 190 and one or more map or routing services 170. In such examples, the route determine 140 can periodically determine the total route of the shared transport service for the duration of the shared transport service, as the driver can continue to perform the shared transport service and may travel along the proposed or potential determined route, or on another route.

In this example, the route determine 140 can include a portion select 150 that can periodically determine the location of the driver and/or the state of the shared transport service (e.g., from the trip information 151), and can periodically select which portions of the total route to provide to the first user and the second user. The portion select 150 can identify the relevant route portions from the total route and provide the individual route portions to the first client device 180*a* and the second client device 180*b*.

Regardless of implementation, in this manner, the system 100 can periodically determine relevant routes based on the state of the shared transport service from a time the shared transport service is arranged for the users until completion of the shared transport service. The system 100 can maintain user privacy (e.g., by not indicating where the other user is being picked up or dropped off on the map user interfaces) by providing relevant route information to individual users and by selectively displaying markers or icons representing user-specific pickup or destination locations to individual users.

While FIGS. 1 through 2C describe the system 100 with respect to two users (e.g., the first user and the second user) that are sharing a transport service, in other examples, the system 100 can arrange a shared transport service for three or more users. In such examples, as described with FIG. 1, the route determine 140 can selectively provide different route lines to each individual user of three or more users based on the state of the driver/transport service. For example, the trip arrange 112 can determine that the driver is to pick up the first user, then the second user, then the third user, and then drop off the first user, then third user, and then the second user. Still further, during the transport service, the driver may further be assigned to pick up and drop off another user (e.g., a fourth user), and so forth. As another example, the trip arrange 112 can determine that the driver is to pick up the first user, then the second user, and then drop off the first user, before picking up the third user. Regardless of the specific order, the route determine 140 can determine the relevant routes for the individual users based on the state of the transport service and provide only those routes to the individual client devices.

In the example in which the driver is to pick up the first user, then the second user, then the third user, and then drop off the first user, then third user, and then the second user, during a state when the driver has not picked up anyone, the first user's client device can receive, from the system 100, data corresponding to a first route (e.g., from the driver's current location to the first user's pickup location), the second user's client device can receive data corresponding to a combination of the first route and a second route (e.g., from the driver's current location to the first user's pickup location to the second user's pickup location), and the third user's client device can receive data corresponding to a combination of the first route, the second route, and a third route (e.g., from the driver's current location to the first user's pickup location to the second user's pickup location to the third user's pickup location). During a state when the driver has picked up the first and second users, but not the third user, the first user's client device can receive data corresponding to a route from the driver's current location to the third user's pickup location to the first user's destination location. The second user's client device can receive data corresponding to a route from the driver's current location to the third user's pickup location to the first user's destination location to the third user's destination location to the second user's destination location. The third user's client device can receive data corresponding to a route from the driver's current location to the third user's pickup location only. Still further, as described, in one or more examples, only those indicators representing user-specific pickup or destination locations are provided to the respective users.

Methodology

Figure 3A:
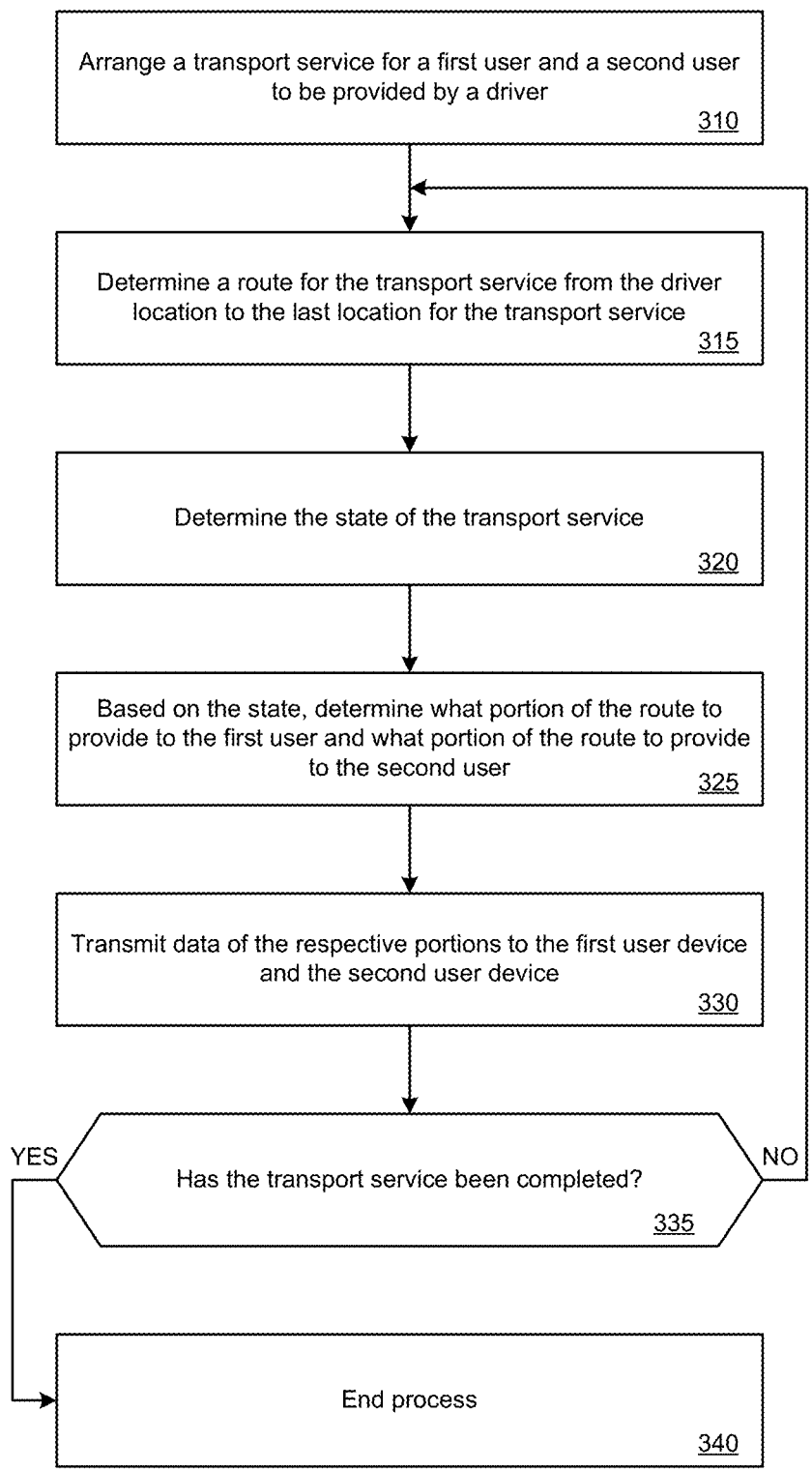
FIGS. 3A and 3B illustrate example methods for providing route information to user devices during a shared transport service.
Figure 3B:
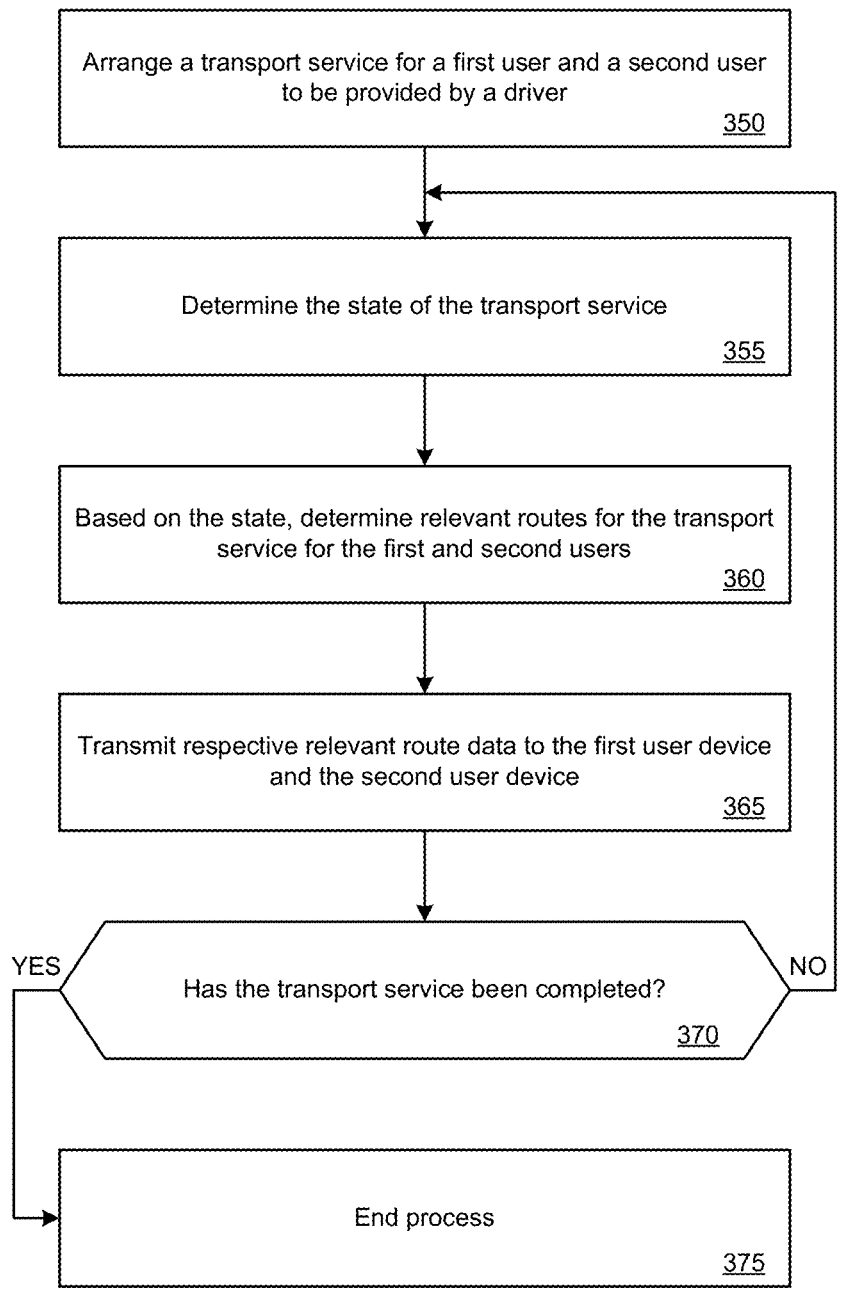

FIGS. 3A and 3B illustrate example methods for providing route information to user devices during a shared transport service. Methods such as described by examples of FIGS. 3A and 3B can be implemented using, for example, components described in FIG. 1. Accordingly, references made to elements of FIG. 1 are for purposes of illustrating a suitable element or component for performing a step or sub-step being described.

In FIG. 3A, a transport service arrangement system, such as the system 100 of FIG. 1, can arrange a shared transport service for a first user and a second user to be provided by a driver (310). The system 100 can also determine the order in which the shared transport service is to be performed based on map data and the location information provided by the first and second users (e.g., a first pickup location and a first destination location provided by the first user, and a second pickup location and a second destination location provided by the second user). For example, the order can specify that the first user is to be picked up first at the first pickup location, then the second user is to be picked up at the second pickup location, then the second user is to be dropped off at the second destination location, and then the first user can finally be dropped off at the first destination location.

The system 100 can determine a route for the shared transport service from the driver's location to the last location of the shared transport service (e.g., a total route) based on the specified order (315). In this example, the total route can correspond to a proposed or potential route for the driver to travel in from the driver's current location to the first pickup location, then to the second pickup location, then to the second destination location, and then to the first destination location. In one example, the system 100 can transmit a route request to a map or routing service 170 in order to query the map or routing service 170 to compute or calculate a route based on the five location data points in the specified order. In another example, the driver application on the driver device 190 can interface with a map application 192 and/or a map or routing service 170 to query the map or routing service 170 to compute or calculate a route based on the five location data points in the specified order.

The system 100 can determine the state of the transport service and/or the location of the driver (320). For example, the driver device 190 can periodically transmit data to the system 100, that includes the driver or device ID, the location of the driver device 190, and/or the state of the shared transport service. In one example, the system 100 can determine the state of the transport service based on previously received state information as a result of driver input. Based on the state and/or the location of the driver, the system 100 can determine what portion of the total route to provide to the first user and what portion of the total route to provide to the second user (325). If the state of the shared transport service is such that both users have been picked up and are being transported by the driver, for example, the system 100 can determine which user is to be dropped off next (or which destination location the driver has to travel to next) based on the specified order.

In this example, because the second user is to be dropped off before the first user, the system 100 can determine that the first user is to be provided a portion of the total route from the driver's current location to the first user's destination location, while the second user is to be provided a portion of the total route from the driver's current location to the second user's destination location. The system 100 can transmit data corresponding to the respective portions to the first user device and the second user device (330). The client application running on the first user device can use the data of the portion for the first user to display the corresponding portion on a map user interface, while the client application running on the second user device can use the data of the portion for the second user to display the corresponding portion on a map user interface.

In some examples, the system 100 can determine whether the shared transport service has been completed (335). The system 100 can determine if the shared transport service has been completed by receiving data from the driver device 190. Depending on implementation, the system 100 can determine that the shared transport service is completed when there is only one user left that is being provided transport (e.g., because the transport service is no longer shared) or when the shared transport service is entirely completed by the driver (e.g., all users have been dropped off).

The system 100 can repeat steps 315 through 330 (e.g., periodically determine the total route from the driver's current location, and periodically transmit relevant portions of the total route to the individual user devices) until the shared transport service is completed. When the shared transport service is completed, the process ends (340), and the system 100 no longer provides route information to the user devices. In this manner, the system 100 can determine the total route based on the driver's location and can dynamically provide relevant portions of the total route to users of a shared transport service.

FIG. 3B is another example method for providing route information to user devices during a shared transport service. FIG. 3B is similar to FIG. 3A except that in FIG. 3B, the system 100 does not determine a total route. Referring to FIG. 3B, the system 100 can arrange a shared transport service for a first and second user (350). The system 100 can also determine that the order of the shared transport service is for the first user to be picked up first at the first pickup location, then the second user is to be picked up at the second pickup location, then the first user is to be dropped off at the first destination location, and then the second user is to be dropped off at the second destination location. The system 100 can determine the state of the shared transport service and/or the driver's location (355). Based on the state of the shared transport service, the system 100 can determine relevant routes for the transport service for the first user and the second user (360).

For example, if the state of the shared transport service is such that the first user has been picked up and the driver is traveling to the second pickup location, the system 100 can (i) determine a route from the driver's current location to the second pickup location and (ii) determine a route from the driver's current location to the first destination location (that runs through the second pickup location). The route from the driver's current location to the second pickup location is relevant to the second user (who has not yet been picked up), while the route from the driver's current location to the first destination location is relevant to the first user. Depending on implementation, the system 100 can determine the relevant routes from one or more different sources, such as by receiving a route from the driver device 190 or receiving a route from a map or routing service.

The system 100 can transmit the respective relevant route data to the first user device and to the second user device (365). Each client application running on the first user device and the second user device can use the respective relevant route data to display the route information on a map user interface. The system 100 can determine whether the shared transport service has been completed, such as described with FIGS. 1 through 3A (370). Steps 355 through 370 can be repeated until the shared transport service is been complete. If the system 100 determines that the shared transport service is complete, the process can end (375), and the system 100 no longer provides route information to the user devices.

Figure 4A:
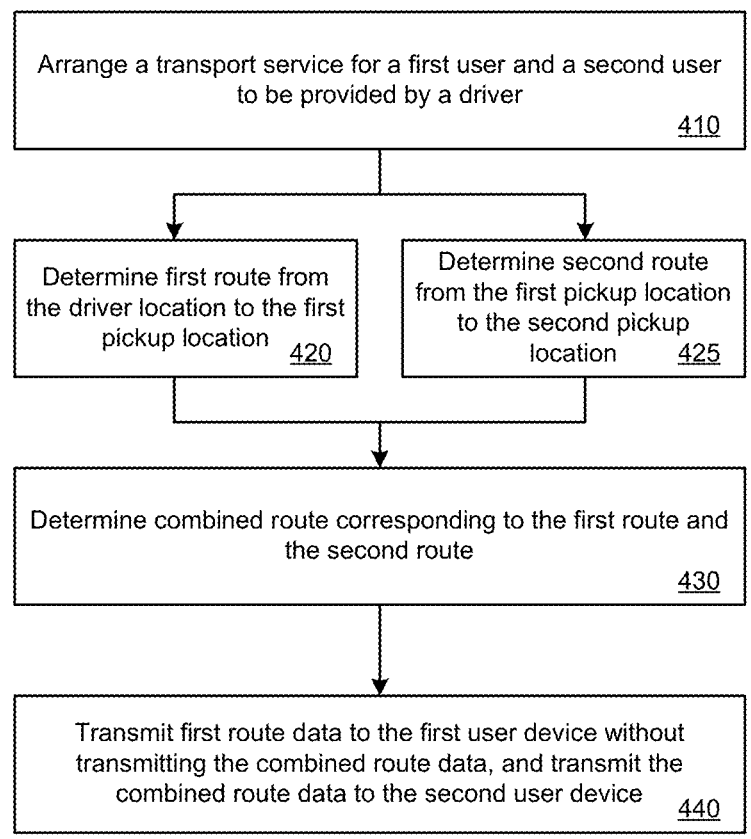
FIGS. 4A and 4B illustrates other example methods for providing route information to user devices during a shared transport service.
Figure 4B:
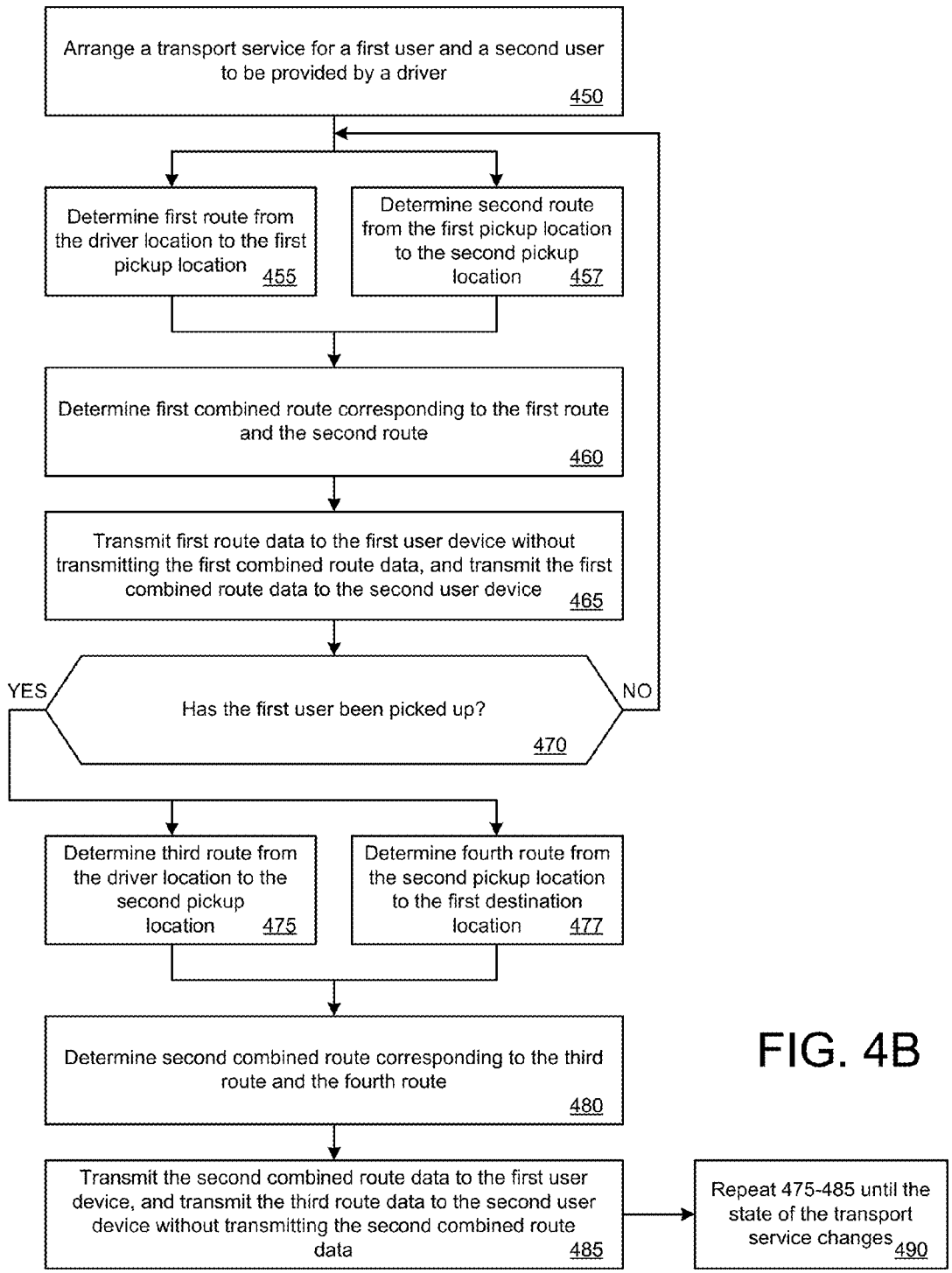

FIGS. 4A and 4B illustrates example methods for providing route information to user devices during a shared transport service, in other examples. Methods such as described by examples of FIGS. 4A and 4B can be implemented using, for example, components described in FIG. 1. Accordingly, references made to elements of FIG. 1 are for purposes of illustrating a suitable element or component for performing a step or sub-step being described.

FIG. 4A illustrates a use case example at an instance in time before the first and second users are picked up by a driver of the shared transport service. For example, the system 100 has arranged a shared transport service for the first user and the second user (410). The system 100 has also determined that the driver is to provide the shared transport service by (i) picking up the first user at the first pickup location, (ii) then picking up the second user at the second pickup location, (iii) then dropping off the first user at the first destination location, and (iv) then dropping off the second user at the second destination location.

At an instance in time when the driver is traveling to the first pickup location, the system 100 can determine a first route from the driver's location to the first pickup location (420) and determine a second route from the first pickup location to the second pickup location (425). Depending on implementation, the system 100 can determine the first route and the second route concurrently or sequentially. The first route can be relevant to the first user, who is waiting to be picked up at the first pickup location, while a combined route of the first and second routes can be relevant to the second user, who is waiting to be picked up at the second pickup location.

The system 100 can determine the first route and the second route using the same source or using different sources. For example, the driver application on the driver device 190 can communicate with a map application and/or a map or routing service. The driver application can determine the first route from the current location of the driver device 190 to the first pickup location. The driver application transmit first data corresponding to the first route to the system 100. The system 100 can communicate with a map or routing service to determine the second route by providing the first pickup location and the second pickup location as a route query to the map or routing service. The map or routing service can provide second data corresponding to the second route to the system 100.

The system 100 can determine the combined route corresponding to the first route and the second route based on the first data and the second data (430). According to some examples, the system 100 can generate the combined route by performing one or more transcoding operations. For example, the first data of the first route can be encoded in a first format. The first data can be encoded in a first format that can be used by the driver application and/or the map application on the driver device 190 (e.g., so that the first route can be properly displayed on a map user interface of the driver application and/or the map application). The system 100 can receive the first data and decode the first data to an intermediate format. The system 100 can also decode the second data of the second route, which can be in a first format or a different second format, into the intermediate format. The system 100 can then combine both the first data in the intermediate format and the second data in the intermediate format to generate the combined route data, which is in the same intermediate format.

In another example, the system 100 can determine the second route after determining the first route, and use data from the first route to determine the second route. In this example, the system 100 can decode the first data from the first format to the intermediate format, and identify the location data point corresponding to the first pickup location (e.g., the last location data point of the first route). The system 100 can use this identified location data point as the starting location data point for the route query to the map or routing service. In this manner, the system 100 can request the route from the map or routing service from the first pickup location to the second pickup location to obtain the second data. The system 100 can decode the second data, which is encoded in the same first format or a different second format, to the intermediate format, and then combine both the first data in the intermediate format and the second data in the intermediate format to generate the combined route data.

Referring back to FIG. 4A, the system 100 can then transmit data corresponding to the first route to the first user device 180*a* without transmitting data corresponding to the combined route, and transmit the data corresponding to the combined route to the second user device 180*b* (440). Depending on implementation, the system 100 can (i) encode the first data that is in the intermediate format back to the first format or to a different third format to be transmitted to the first user device 180*a*, and encode the combined route data that is in the intermediate format back to the first format, to the same third format, or to a different fourth format to be transmitted to the second user device 180*b*, or (ii) transmit the first data in the intermediate format to the first user device 180*a*, and transmit the combined route data in the intermediate format to the second user device 180*b*. In one example, the system 100 can determine (e.g., from the user ID or the device ID of the first user and the second user) what formatting of the data is necessary so that the first user device 180*a* and the second user device 180*b* can appropriately display the route information.

The client application on the first user device 180*a* can use the data corresponding to the first route to display the first route on a map user interface on the first user device 180*a*. The client application on the second user device 180*b* can use the data corresponding to the combined route to display the combined route on a map user interface on the second user device 180*b*.

FIG. 4B illustrates the use case example of FIG. 4A during a time before the first and second users are picked up by a driver of the shared transport service and after the first user is picked up. Accordingly, multiple states of the shared transport service is described in the example of FIG. 4B. For example, the system 100 has arranged a shared transport service for the first user and the second user (450). Like FIG. 4A, the system 100 has determined that the driver is to provide the shared transport service by (i) picking up the first user at the first pickup location, (ii) then picking up the second user at the second pickup location, (iii) then dropping off the first user at the first destination location, and (iv) then dropping off the second user at the second destination location. The system 100 can perform steps 455, 457, 460, and 465, such as described in FIG. 4A.

The system 100 determines if the first user has been picked up (470). If not, the system 100 repeats steps 455, 457, 460, and 465. As such, the system 100 periodically determines the first and second routes and periodically transmits route information relevant to the individual users to the first and second user devices 180*a*, 180*b* (e.g., to account for the driver changing positions as he or she travels to the first pickup location). By periodically transmitting route information to the user devices 180*a*, 180*b*, the route lines that are displayed on the map user interfaces can dynamically change due to the position of the driver changing. When the system 100 determines that the first user has been picked up (e.g., in response to receiving state data from the driver device 190), the system 100 can determine a third route from the driver's location to the second pickup location (475) and determine a fourth route from the second pickup location to the first destination location (477). In different variations, the system 100 can determine the third route and the fourth route concurrently or sequentially. The third route can be relevant to the second user, who is waiting to be picked up at the second location, while a combined route of the third and fourth routes can be relevant to the first user, who is now in the driver's vehicle traveling to the second pickup location and to the first destination location.

The system 100 can determine the combined route corresponding to the third route and the fourth route (480), such as described in FIG. 4A, and can transmit data corresponding to the third route to the second user device 180b without transmitting data corresponding to the combined route of the third and fourth routes, and transmit the data corresponding to this combined route to the first user device 180a (485). The system 100 can repeat steps 475 through 485 until the state of the transport service changes again, e.g., such as when the driver arrives at the second pickup location and picks up the second user (490).

Hardware Diagrams

Figure 5:
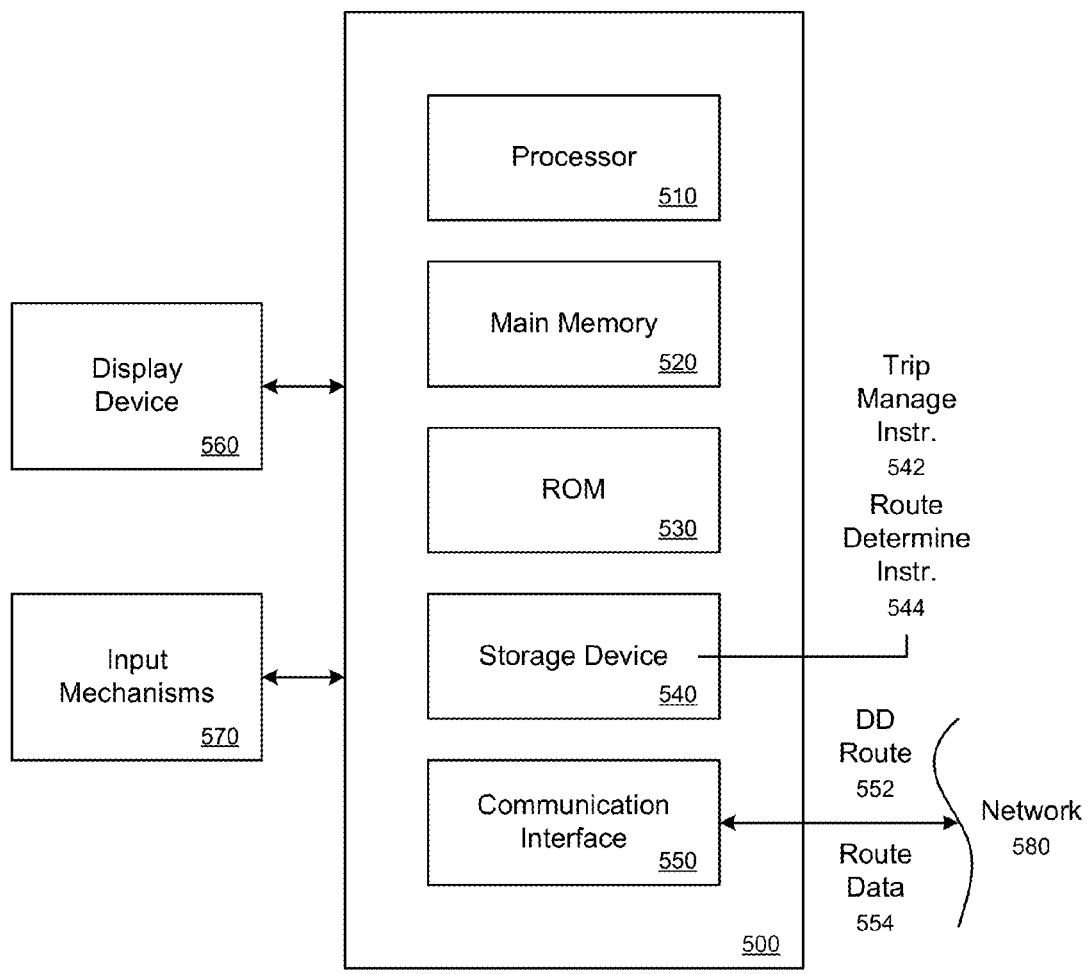
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, the system 100 may be implemented using a computer system such as described by FIG. 5. The system 100 may also be implemented using a combination of multiple computer systems as described by FIG. 5.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including trip manage instructions 542 and route determine instructions 544.

For example, the processor 510 can execute the trip manage instructions 542 to implement logic for arranging a shared transport service for multiple users, such as described in FIGS. 1 through 4B, and execute the route determine instructions 544 to implement logic for determining relevant routes for the users and transmitting data corresponding to the routes to the respective user devices, such as described in FIGS. 1 through 4B.

The communication interface 550 can enable the computer system 500 to communicate with one or more networks 580 (e.g., cellular network) through use of the network link (wireless or wireline). Using the network link, the computer system 500 can communicate with one or more other computing devices and/or one or more other servers or datacenters. In some variations, the computer system 500 can receive driver device routes 552 from a driver device of the driver performing the shared transport service via the network link. The computer system 500 can also provide route data 554 corresponding to different route information for different users of the shared transport service, as described in FIGS. 1 through 4B, via the network link.

The computer system 500 can also include a display device 560, such as a cathode ray tube (CRT), an LCD monitor, or a television set, for example, for displaying graphics and information to a user. One or more input mechanisms 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
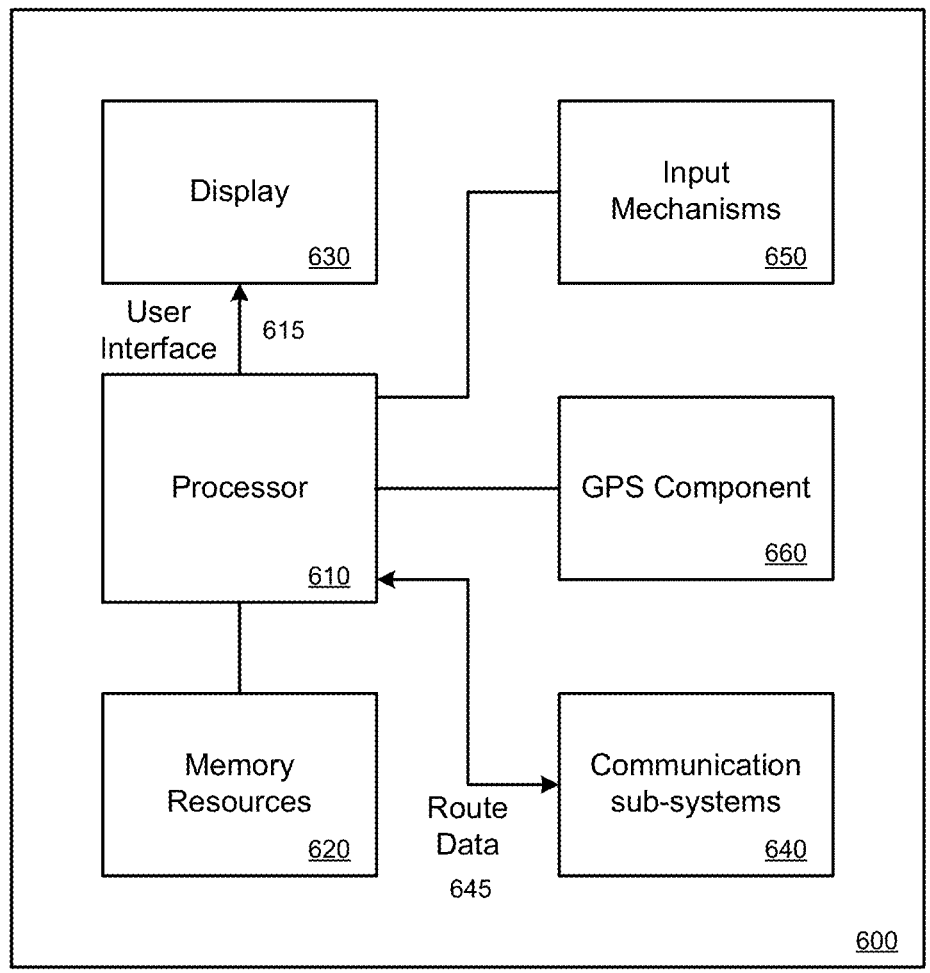
FIG. 6 is a block diagram that illustrates a mobile computing device upon which embodiments described herein may be implemented.

FIG. 6 is a block diagram that illustrates a mobile computing device upon which embodiments described herein may be implemented. In one embodiment, a computing device 600 may correspond to a mobile computing device, such as a cellular device that is capable of telephony, messaging, and data services. The computing device 600 can correspond to a client device or a driver device. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 can provide a variety of content to the display 630 by executing instructions and/or applications that are stored in the memory resources 620. For example, the processor 610 is configured with software and/or other logic to perform one or more processes, steps, and other functions described with implementations, such as described by FIGS. 1 through 5, and elsewhere in the application. In particular, the processor 610 can execute instructions and data stored in the memory resources 620 in order to operate a client service application or a map application, as described in FIGS. 1 through 5. Still further, the processor 610 can cause one or more user interfaces 615 to be displayed on the display 630, such as one or more user interfaces provided by the service application, including a map user interface. Such a user interface 615 can display selectable features, for example, to enable a user to make a shared transport request, and provide a pickup location and a destination location.

A user can operate the computing device 600 to operate the client application in order to make a request for a shared transport service. In one example, after the shared transport service is arranged for the user, the client application can periodically receive route data 645 relevant to the user from the transport arrangement system, such as described in FIGS. 1 through 5. The route data 645 can be based on the state of the shared transport service. While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method of providing information about a transport service to user devices, the method being performed by a computing device and comprising:
   arranging a transport service for a first user and a second user by selecting a driver to concurrently provide transport for the first user and the second user for at least a portion of the transport service;
   tracking a location of a driver device of the driver using a location detection mechanism of the driver device;
   during a first duration of time:
      (i) determining first data corresponding to a first route from a first location of the driver device to a first pickup location of the first user;
      (ii) determining second data corresponding to a second route from the first pickup location to a second pickup location of the second user;
      (iii) determining a first combined route corresponding to the first route and the second route based on the first data and the second data; and
      (iv) transmitting (a) the first data corresponding to the first route without transmitting data corresponding to the first combined route to a first user device of the first user, and (b) the data corresponding to the first combined route to a second user device of the second user; and
   during a second duration of time after the first duration of time:
      (i) determining third data corresponding to a third route from a second location of the driver device to the second pickup location;
      (ii) determining fourth data corresponding to a fourth route from the second pickup location to a first destination location of the first user;
      (iii) determining a second combined route corresponding to the third route and the fourth route based on the third data and the fourth data; and
      (iv) transmitting (a) data corresponding to the second combined route to the first user device, and (b) the third data corresponding to the third route without transmitting the data corresponding to the second combined route to the second user device.

2. The method of claim 1, wherein arranging the transport service for the first user and the second user includes receiving a first transport request from the first user device and receiving a second transport request from the second user device, the first transport request including information about the first pickup location and the second transport request including information about the second pickup location.

3. The method of claim 2, wherein the first transport request includes information about the first destination location and the second transport request includes information about a second destination location, and wherein arranging the transport service for the first user and the second user includes determining that the driver is to pick up the first user before picking up the second user based on the first pickup location, the second pickup location, the first destination location, and the second destination location.

4. The method of claim 1, wherein arranging the transport service for the first user and the second user includes (i) transmitting a first invitation to the driver device along with information about the first pickup location, (ii) receiving an acceptance from the driver device, the acceptance being received in response to the driver providing input on the driver device, and (iii) transmitting a second invitation to the driver device along with information about the second pickup location to the driver device.

5. The method of claim 1, wherein determining the first data includes receiving the first data from the driver device, and wherein the driver device receives the first data from a first mapping service.

6. The method of claim 5, wherein determining the second data includes using a second mapping service that operates independently from the first mapping service, and wherein the computing device operates the second mapping service or has access to the second mapping service.

7. The method of claim 1, wherein the first duration of time corresponds to a time when the driver is traveling to the first pickup location, and wherein the second duration of time corresponds to a time after the driver has traveled to the first pickup location.

8. A system for providing information about a transport service, the system comprising:
   one or more processors; and
   one or more memory resources storing instructions that, when executed by the one or more processors, cause the system to:
      arrange a transport service for a first user and a second user by selecting a driver to concurrently provide transport for the first user and the second user for at least a portion of the transport service;
      track a location of a driver device of the driver using a location detection mechanism of the driver device;
      during a first duration of time:
         (i) determine first data corresponding to a first route from a first location of the driver device to a first pickup location of the first user;
         (ii) determine second data corresponding to a second route from the first pickup location to a second pickup location of the second user;
         (iii) determine a first combined route corresponding to the first route and the second route based on the first data and the second data; and (iv) transmit (a) the first data corresponding to the first route without transmitting data corresponding to the first combined route to a first user device of the first user, and (b) the data corresponding to the first combined route to a second user device of the second user; and during a second duration of time after the first duration of time:
(i) determine third data corresponding to a third route from a second location of the driver device to the second pickup location;
(ii) determine fourth data corresponding to a fourth route from the second pickup location to a first destination location of the first user;
(iii) determine a second combined route corresponding to the third route and the fourth route based on the third data and the fourth data; and
(iv) transmit (a) data corresponding to the second combined route to the first user device, and (b) the third data corresponding to the third route without transmitting the data corresponding to the second combined route to the second user device.

9. The system of claim 8, wherein arranging the transport service for the first user and the second user includes receiving a first transport request from the first user device and receiving a second transport request from the second user device, the first transport request including information about the first pickup location and the second transport request including information about the second pickup location.

10. The system of claim 9, wherein the first transport request includes information about the first destination location and the second transport request includes information about a second destination location, and wherein arranging the transport service for the first user and the second user includes determining that the driver is to pick up the first user before picking up the second user based on the first pickup location, the second pickup location, the first destination location, and the second destination location.

11. The system of claim 8, wherein arranging the transport service for the first user and the second user includes (i) transmitting a first invitation to the driver device along with information about the first pickup location, (ii) receiving an acceptance from the driver device, the acceptance being received in response to the driver providing input on the driver device, and (iii) transmitting a second invitation to the driver device along with information about the second pickup location to the driver device.

12. The system of claim 8, wherein determining the first data includes receiving the first data from the driver device, and wherein the driver device receives the first data from a first mapping service.

13. The system of claim 12, wherein determining the second data includes using a second mapping service that operates independently from the first mapping service, and wherein the system operates the second mapping service or has access to the second mapping service.

14. The system of claim 8, wherein the first duration of time corresponds to a time when the driver is traveling to the first pickup location, and wherein the second duration of time corresponds to a time after the driver has traveled to the first pickup location.

15. A non-transitory computer-readable medium storing instructions that, when executed by a processor of a computing device, causes the computing device to:
arrange a transport service for a first user and a second user by selecting a driver to concurrently provide transport for the first user and the second user for at least a portion of the transport service;
track a location of a driver device of the driver using a location detection mechanism of the driver device;
during a first duration of time:
(i) determine first data corresponding to a first route from a first location of the driver device to a first pickup location of the first user;
(ii) determine second data corresponding to a second route from the first pickup location to a second pickup location of the second user;
(iii) determine a first combined route corresponding to the first route and the second route based on the first data and the second data; and
(iv) transmit (a) the first data corresponding to the first route without transmitting data corresponding to the first combined route to a first user device of the first user, and (b) the data corresponding to the first combined route to a second user device of the second user; and during a second duration of time after the first duration of time:
(i) determine third data corresponding to a third route from a second location of the driver device to the second pickup location;
(ii) determine fourth data corresponding to a fourth route from the second pickup location to a first destination location of the first user;
(iii) determine a second combined route corresponding to the third route and the fourth route based on the third data and the fourth data; and
(iv) transmit (a) data corresponding to the second combined route to the first user device, and (b) the third data corresponding to the third route without transmitting the data corresponding to the second combined route to the second user device.

16. The non-transitory computer-readable medium of claim 15, wherein arranging the transport service for the first user and the second user includes receiving a first transport request from the first user device and receiving a second transport request from the second user device, the first transport request including information about the first pickup location and the second transport request including information about the second pickup location.

17. The non-transitory computer-readable medium of claim 16, wherein the first transport request includes information about the first destination location and the second transport request includes information about a second destination location, and wherein arranging the transport service for the first user and the second user includes determining that the driver is to pick up the first user before picking up the second user based on the first pickup location, the second pickup location, the first destination location, and the second destination location.

18. The non-transitory computer-readable medium of claim 15, wherein arranging the transport service for the first user and the second user includes (i) transmitting a first invitation to the driver device along with information about the first pickup location, (ii) receiving an acceptance from the driver device, the acceptance being received in response to the driver providing input on the driver device, and (iii) transmitting a second invitation to the driver device along with information about the second pickup location to the driver device.

19. The non-transitory computer-readable medium of claim 15, wherein determining the first data includes receiving the first data from the driver device, and wherein the driver device receives the first data from a first mapping service, and wherein determining the second data includes using a second mapping service that operates independently from the first mapping service, and wherein the computing device operates the second mapping service or has access to the second mapping service.

20. The non-transitory computer-readable medium of claim 15, wherein the first duration of time corresponds to a time when the driver is traveling to the first pickup location, and wherein the second duration of time corresponds to a time after the driver has traveled to the first pickup location.

\* \* \* \* \*